INVENTORS
CHARLES R. RONAN
EARL S. STEVENS

BY Edwin D. Grant
ATTORNEY

United States Patent Office 3,817,808
Patented June 18, 1974

3,817,808
METHOD OF FORMING CORE PANELS
Charles R. Ronan, Santa Ana, and Earl S. Stevens, Riverside, Calif., assignors to Rohr Industries, Inc.
Continuation of abandoned application Ser. No. 861,734, Sept. 29, 1969. This application May 1, 1972, Ser. No. 249,432
Int. Cl. B32b 7/14
U.S. Cl. 156—291
2 Claims

ABSTRACT OF THE DISCLOSURE

A bar of solid adhesive is applied to a hot roller to thereby melt said adhesive and coat it on an applicator roller and then a portion of this melted adhesive is transferred from the applicator roller to the faying edges of a honeycomb core by pressing the latter against the applicator roller and moving the core and the applicator roller relative to each other. A facing sheet is subsequently held against the coated faying edges of the core while the adhesive is cured, thereby bonding the core to the facing sheet.

This is a continuation, of application Ser. No. 861,734, filed Sept. 29, 1969, now abandoned.

SUMMARY OF THE INVENTION

This invention relates to panels and more particularly to an improved method of fabricating panels of the type having cores to which facing sheets are bonded along lines or points, commonly identified as the honeycomb or diamond types.

In the manufacture of lightweight panels of the type used in aircraft it is a common practice to bond a facing sheet to the faying edges of a honeycomb core by means of a sheet of brazing alloy or polymeric material which is placed between the facing sheet and the core and then heated to melting temperature and thereafter cured to bond the aforesaid panel components together. The use of such sheet bonding material adds unnecessary weight to a panel of the aforesaid type since the adhesive covers the entire inner surface of a facing sheet rather than only the limited areas between said facing sheet and the faying edges of the core.

By means of the invention disclosed herein facing sheets can be attached to the faying edges or bonding points of cores with bonding material that is located only at the points where said edges or bonding points abut said facing sheets, thereby minimizing the weight of panels without in any way adversely affecting the strength thereof. Furthermore, this invention provides a method of fabricating core panels which can easily and rapidly be performed with only two basic process steps, namely, a first step wherein melted adhesive is applied to a rotating coating roller as the latter is either moved across one side of a core or the core is moved across the coating roller, and a second step wherein a facing sheet is pressed against the coated core when the adhesive is cured. Preferably the core is held against the coating roller by a nip roller and a doctor roller is employed to control the thickness of the layer of melted adhesive applied to the coating roller.

DETAILED DESCRIPTION

Figure 1:
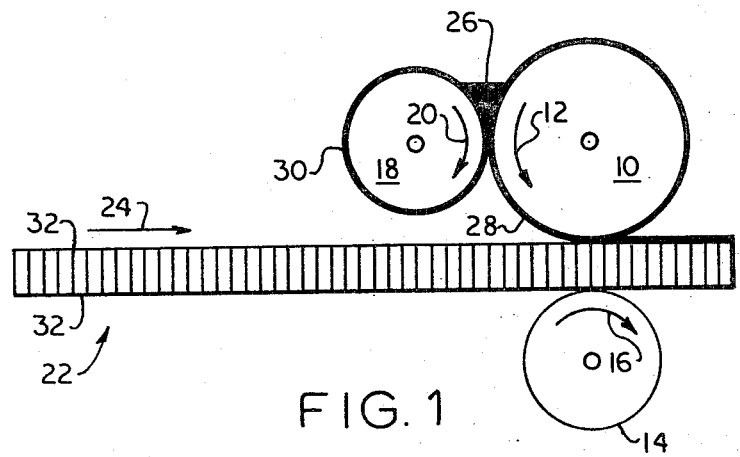
FIG. 1 is a schematic representation of a preferred mode of performing a first step in the fabrication of honeycomb core panels in accordance with this invenion.

In FIG. 1 the number 10 designates an applicator or coating roller which is mounted for rotation about a fixed horizontal axis and which is connected to conventional drive means (not shown) adapted to turn the roller in the direction indicated by arrow 12 when the illustrated apparatus is operated. Disposed in spaced, parallel relation under coating roller 10 is a nip roller 14 which preferably is interconnected with the aforementioned drive means so that it rotated in the direction indicated by arrow 16 as the coating roller is rotated. A third doctor roller 18 is mounted in spaced, parallel relation beside coating roller 10 and is rotated by the drive means in the direction indicated by arrow 20.

The nip and doctor rollers are preferably arranged so that they can be spaced at different distances from coating roller 10. Thus the gap between coating roller 10 and nip roller 14 can be adjusted so that the faying edges at one end of a honeycomb core, generally designated by the number 22 and having any selected thickness, can be engaged with these rollers, whereupon the core is pulled in the direction indicated by arrow 24 as a result of the counterclockwise rotation of the coating roller and the clockwise rotation of the nip roller (as the rollers are viewed in FIG. 1). To avoid crushing of cell walls in cores which do not have a uniform thickness, the peripheral portions of the coating roller and the nip roller are formed of a suitable resilient material.

Doctor roller 18 is heated by conventional means (not shown), such as steam supply pipes, hot oil, or electric heating coils. Consequently a selected bonding material in solid form can be placed at the pinch point of the coating and doctor rollers (i.e., at the point occupied by the body of adhesive 26 in FIG. 1), and this bonding material is then melted by the heat which it absorbs from the doctor roller. End plates (not shown) are provided to keep the melted adhesive from flowing off the ends of the coating roller and the doctor roller. It will be obvious that the thickness of adhesive layers 28, 30 which are coated on the coating roller and the doctor roller after the solid adhesive is melted depends upon the size of the gap between said rollers. Since doctor roller 18 is mounted for movement toward or away from coating roller 10, the thickness of the adhesive 28 on the coating roller can be selected.

Figure 2:
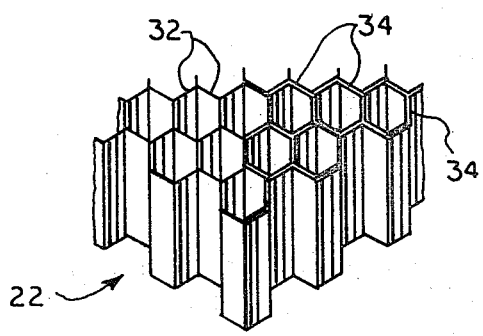
FIG. 2 is a pictorial representation of a section of honeycomb core the edges of one side of which are partially coated with adhesive by the method of the invention.

When a honeycomb core 22 is passed between coating roller 10 and nip roller 14 a portion of adhesive layer 28 on said coating roller is transferred to the faying edges 32 of the core, as illustrated in FIG. 2 wherein the beads of transferred adhesive are designated by the number 34. It has been found that the described procedure applies adhesive to the faying edges of a core in continuous beads which are much more uniform in thickness and width than the beads placed on faying edges of the same type of core by the immersion of the latter in melted adhesive. Furthermore, the roller coating method of this invention does not close cell openings of a core with a film of adhesive, such as occurs when a sheet of adhesive is employed to bond a core to facing sheets.

Figure 3:
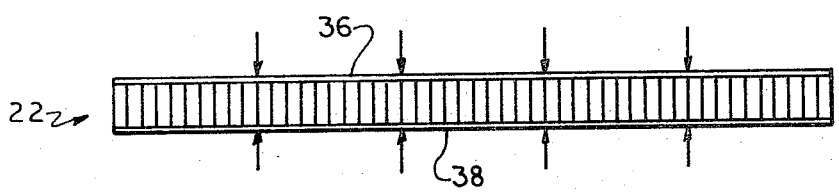
FIG. 3 is a schematic representation of a second process step in the fabrication of a honeycomb core panel in accordance with the invention.

After the faying edges on one side of a honeycomb core are coated with melted adhesive as described hereinbefore, a facing sheet 36 (see FIG. 3) is placed against these coated edges and a caul sheet 38 is preferably placed against the other side of said core. As illustrated by arrows in FIG. 3, pressure is then applied to the facing sheet and the caul sheet by conventional means such as a vacuum bag (not shown), and the assembly is heated to permit the adhesive on the faying edges of the core to solidify and thereby bond the core and the facing sheet together. The faying edges of the uncovered side of the core can thereafter be bonded to a second facing sheet by repeating the described process steps.

The method of the invention is further illustrated by the following specific example. Apparatus of the type illustrated in FIG. 1 was provided with a coating roller 10 the outer portion of which was formed of resilient rubber, a nip roller 14 the outer portion of which was formed of hard rubber, and a doctor roller 18 formed of chromium plated steel. The nip roller was adjusted so that there was a .760 inch gap between it and the coating roller, and the doctor roller was adjusted so that there was an .042 to .046 inch gap between it and said coating roller. The temperature of the doctor roller was maintained at approximately 190° F., and a billet of modified epoxy adhesive was placed at the pinch point of the coating and doctor rollers and allowed to melt. With the coating, nip, and doctor rollers rotating at such angular velocity that their surface velocities were approximately 10 feet per minute, a honeycomb core having a thickness of 0.750 inch was fed between the coating and nip rollers. The core was formed of 5053 T3 Aluminum and its cells were hexagonal in shape with a wall thickness of .0015 inch and a wall width of 3/8 inch. It was found that 0.55 pound of adhesive was placed on each square foot of side area of the core, and the beads of this adhesive were uniformly applied to the faying edges of the core in the manner illustrated in FIG. 2. The core and facing sheets were placed in a vacuum bag to thereby exert a pressure substantially equal to atmospheric pressure on the facing sheets. The enveloped panel components were final cured at 350° F. and then cooled to ambient temperature. The bond which was thus formed between the core and the facing sheet placed against the coated side of the core was found to have the same strength as a bond formed between the same type of core and a facing sheet by the use of adhesive in sheet form.

It will be obvious that the invention is not limited to the use of a particular adhesive or to the specific operating conditions described in the foregoing example, which has been presented only for the purpose of illustration. Hence the scope of the invention should be considered to be limited only by the terms of the claims appended hereto.

What is claimed as new and useful and desired to be secured by U.S. Letters Patent is:

1. A method of forming a panel consisting of a rigid thin walled metallic honeycomb core and a facing sheet bonded together comprising:
   (a) transferring a hot melt roller coating of an epoxy adhesive onto the faying edges on one face of the honeycomb core in a sufficiently thin layer of predetermined thickness thereon to form a continuous thin bead of adhesive of uniform thickness at an along said faying edges of the core by
      (1) rotating a doctor roller a predetermined distance from the coating roller to form a gap therebetween substantially equal to the thickness of the melted coating of adhesive;
      (2) positioning the adhesive in bar form in the gap;
      (3) heating one of the coating and doctor rollers to a predetermined temperature sufficiently high to melt the adhesive and apply it to the coating roller in the thin coating of such predetermined viscosity to provide the thin layer of adhesive;
      (4) rotating a nip roller a predetermined distance from the coating roller to pull the core therebetween and apply the thin layer of adhesive thereto from the coating of the melted adhesive; and
      (5) rotating said coating, doctor and nip rollers at uniform predetermined surface velocities to provide the thin layer of adhesive;
   (b) holding said one face of the core and facing sheet against each other while the applied adhesive is cured to bond the core and facing sheet together.

2. The method of claim 1 wherein transferring the adhesive comprises:
   applying a thin coating of melted epoxy adhesive on a rotating coating roller sufficient in thickness to provide the thin layer; and
   holding the core sufficiently against the melted coating of adhesive to transfer the thin layer to the core.

References Cited
UNITED STATES PATENTS

| | | | |
|---|---|---|---|
| 3,656,992 | 4/1972 | Lynam | 156—197 |
| 2,719,809 | 10/1955 | Herts | 156—292 X |
| 2,926,628 | 3/1960 | Black | 118—244 |
| 2,964,799 | 12/1960 | Roggi | 264—47 |
| 3,082,142 | 3/1963 | Payne | 156—197 |
| 2,385,352 | 9/1945 | Davis | 156—292 |

GEORGE F. LESMES, Primary Examiner

E. P. ROBINSON, Assistant Examiner

U.S. Cl. X.R.

156—197, 290, 320, 330; 161—68